United States Patent [19]
Burgess et al.

[11] Patent Number: 5,272,844
[45] Date of Patent: Dec. 28, 1993

[54] POLISHING FIXTURE WITH ADJUSTABLE SAMPLE MOUNT WITH ADJUSTABLE WEIGHT

[76] Inventors: David L. Burgess, 470 Laurel Ave., Half Moon Bay, Calif.; Orlin D. Trapp, 51 Hillbrook Dr., Portola Valley, Calif.

[21] Appl. No.: 851,464

[22] Filed: Mar. 13, 1992

[51] Int. Cl.⁵ .................... B24B 41/06; B23Q 3/00
[52] U.S. Cl. ........................ 51/216 A; 51/216 R; 51/125; 269/58
[58] Field of Search ............ 51/216 R, 217 R, 217 T, 51/217 A, 216 A, 216 T, 220, 229, 125, 125.5; 269/58, 71, 73, 91, 92

[56] References Cited

U.S. PATENT DOCUMENTS

| | | | |
|---|---|---|---|
| 4,344,259 | 8/1982 | Barolin | 51/216 LP |
| 4,536,992 | 8/1985 | Hennenfent | 51/229 X |
| 4,625,460 | 12/1986 | Burgess et al. | 51/125 |
| 4,850,157 | 7/1989 | Holmstrand | 51/125 |
| 4,876,826 | 10/1989 | Denboer | 51/216 R X |

Primary Examiner—Bruce M. Kisliuk
Assistant Examiner—Bryan Reichenbach
Attorney, Agent, or Firm—Flehr, Hohbach, Test, Albritton & Herbert

[57] ABSTRACT

A fixture for use in non-encapsulated cross-sectioning of a sample adapted to permit adjustment of the angle of cross-sectioning having a mounting block with front and bottom surfaces and a recess extending through the front and bottom surfaces. An elongate saddle having first and second end portions is pivotably mounted in the recess on the mounting block. A resilient member is disposed between the mounting block and the second end portion of the elongate saddle for applying a yieldable force between the mounting block and the second end portion. A set screw is threaded into the mounting block and engages the first end portion of the elongate saddle for adjusting the position of the first end portion of the elongate saddle with respect to the mounting block. A sample holder is mounted on the elongate saddle for holding the sample.

18 Claims, 2 Drawing Sheets

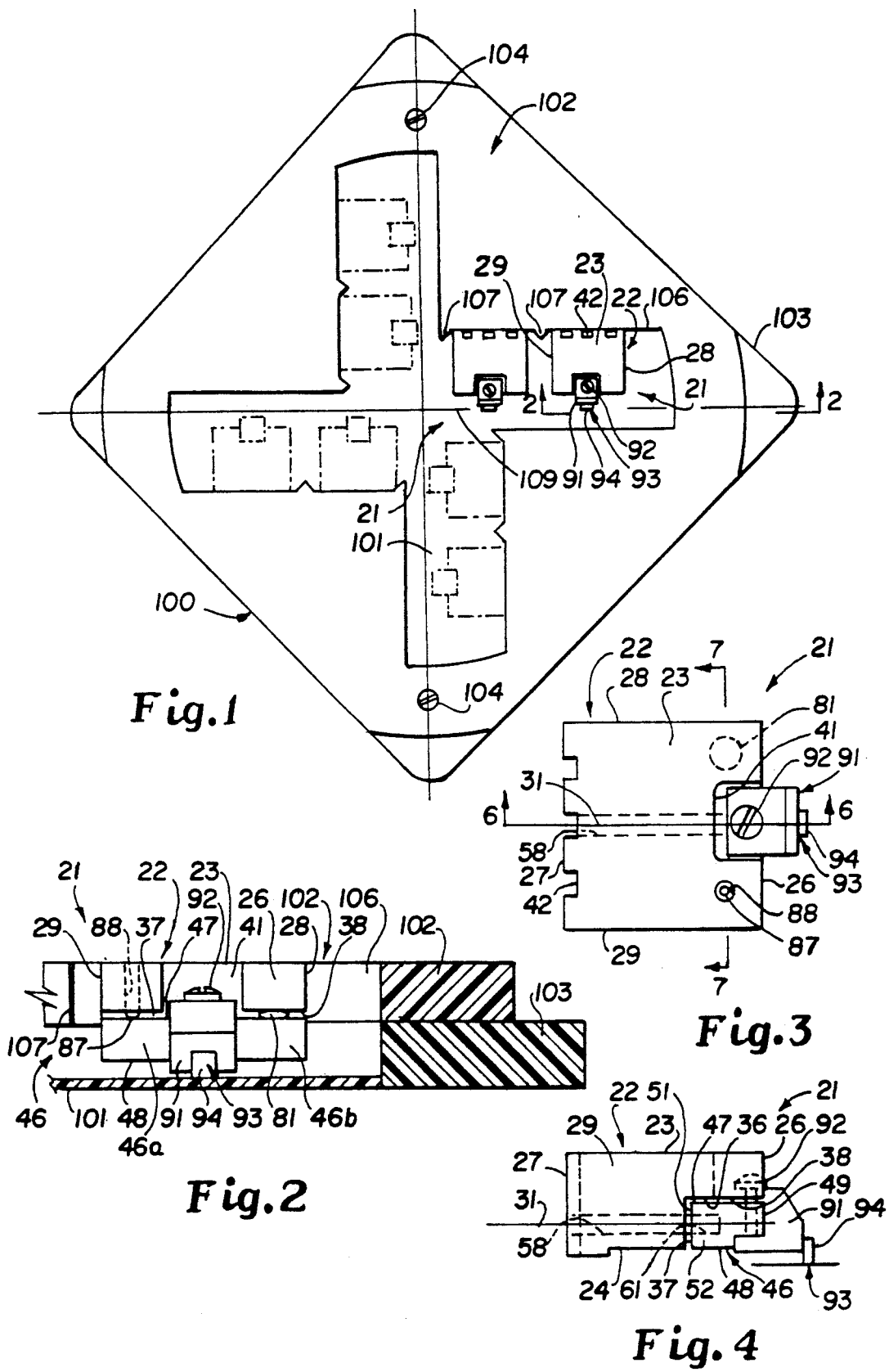

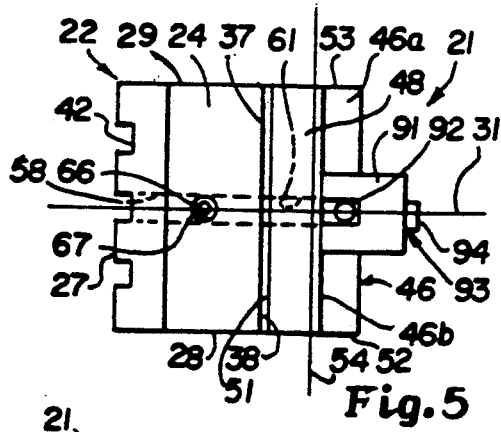
Fig. 5
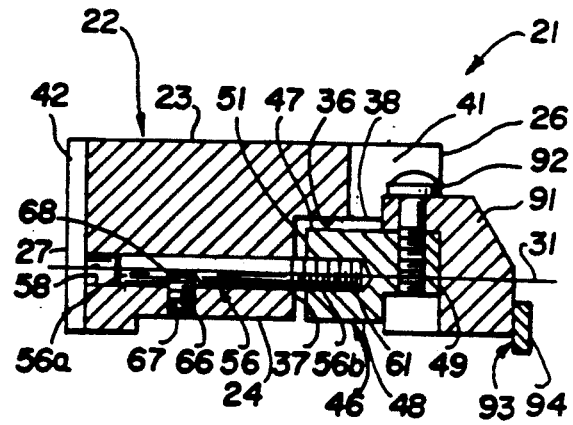
Fig. 6
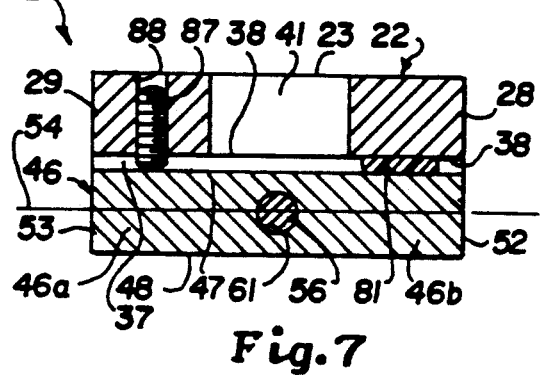
Fig. 7
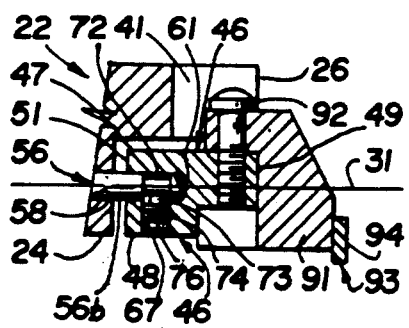
Fig. 9
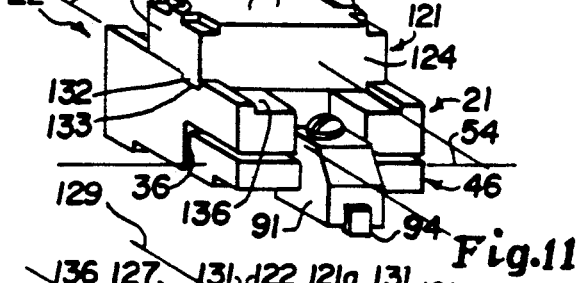
Fig. 8
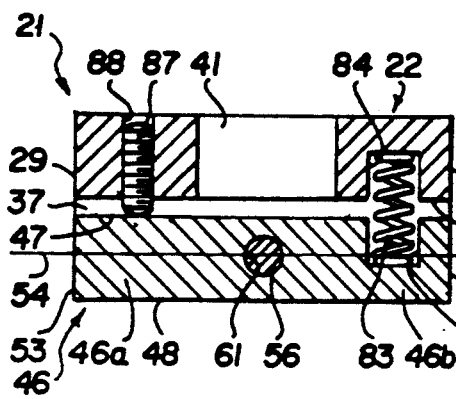
Fig. 10
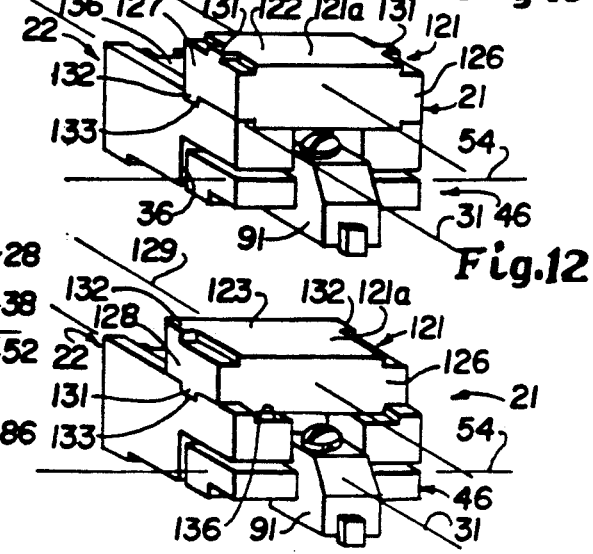
Fig. 11
Fig. 12
Fig. 13

POLISHING FIXTURE WITH ADJUSTABLE SAMPLE MOUNT WITH ADJUSTABLE WEIGHT

This invention relates to a polishing fixture for the non-encapsulated cross-sectioning of a sample and more particularly to a polishing fixture with an adjustable elongate saddle for adjusting the angle of microsectioning and with an adjustable weight for adjusting the gravitational force on a sample.

It is often necessary to microsection integrated circuits or other samples to better examine portions thereof through the use of an electron microscope or otherwise. A fixture for accomplishing such cross-sectioning without encapsulating the sample is shown in U.S. Pat. No. 4,625,460. The contact angle between a sample mounted on the mounting block of such a fixture and the polishing wheel can be adjusted by building up one side of the bottom of the mounting block with Teflon tape to tiltably orient the mounting block with respect to the polishing wheel. In the lapping or polishing of integrated circuits having one micron wide lines or less, it is desirable to be able to polish parallel to those lines. In order to do this, the alignment of the sample with respect to the polishing wheel must be very exact. Utilizing Teflon tape to adjust the alignment has proved at best to be a gross adjustment and is very skill oriented. Additional means is also needed for adjusting the weight on the sample to thereby control the polishing rate. Because of the foregoing, there is a need for a new and improved polishing fixture which overcomes the above named disadvantages.

In general, it is an object of the present invention to provide a polishing fixture with a mounting block which can be precisely adjusted in angle after a sample has been mounted on the mounting block.

Another object of the invention is to provide a fixture of the above character which permits adjustment of the gravitational force on the sample during polishing.

Additional objects and features of the invention will appear from the following description from which the preferred embodiments are set forth in detail in conjunction with the accompanying drawings.

FIG. 1 is a top plan view of an apparatus for microsectioning having two fixtures incorporating the present invention mounted thereon.

FIG. 2 is a cross-sectional view taken along the line 2—2 of FIG. 1.

FIG. 3 is a top plan view of the fixture shown in FIGS. 1 and 2.

FIG. 4 is a side elevational view of the fixture shown in FIG. 3.

FIG. 5 is bottom plan view of the fixture shown in FIG. 3.

FIG. 6 is a cross-sectional view looking along the line 6—6 of FIG. 3.

FIG. 7 is a cross-sectional view looking along the line 7—7 of FIG. 3.

FIG. 8 is a cross-sectional view similar to FIG. 6 showing another embodiment of a fixture incorporating the present invention.

FIG. 9 is a cross-sectional view similar to FIG. 6 showing still another embodiment of a fixture incorporating the present invention.

FIG. 10 is a cross-sectional view similar to FIG. 7 showing another embodiment of a fixture incorporating the present invention.

FIG. 11 is an isometric view of a fixture incorporating another embodiment of the invention which includes an adjustable weight in a first position for adjustment of the gravitational force on the sample.

FIG. 12 is an isometric view of the fixture shown in FIG. 11 showing the weight in a second position.

FIG. 13 is an isometric view of the fixture shown in FIG. 11 showing the weight in a third position.

In general, the fixture of the present invention is for use in the non-encapsulated cross-sectioning of a sample and includes a mounting block, an elongate saddle and a sample holder. The mounting block has front and bottom surfaces with a recess extending therethrough. The elongate saddle has first and second end portions and is pivotably mounted in the recess on the mounting block to permit pivotable movement of the elongate saddle about its end portions. Resilient means is disposed between the mounting block and the second end portion of the elongate saddle which applies a yieldable force against the mounting block and the second end portion. An adjustment mechanism is provided in the mounting block and engages the first end portion of the elongate saddle to adjust the position of the first end portion of the elongate saddle with respect to the mounting block against the force of the resilient means. The sample to be cross sectioned is mounted on a sample holder removably mounted on the elongate saddle.

A fixture 21 incorporating the present invention as shown in FIGS. 1 through 7 consists of a mounting block 22 in the form of a parallelepiped having top and bottom surfaces 23 and 24, front and back surfaces 26 and 27, and side surfaces 28 and 29. Mounting block 22 has a longitudinal axis 31 which extends perpendicular to front and back surfaces 26 and 27. The mounting block is provided with a recess 36 which extends through front and bottom surfaces 26 and 24 of the mounting block and is defined by rear wall 37 and upper wall 38. Mounting block 22 also is provided with a U-shaped recess 41 extending into recess 36 and several vertical recesses 42 on back surface 27, each used for a purpose hereinafter described.

An elongate saddle 46 is pivotably mounted in recess 36 of mounting block 22. Elongate saddle 46 is in the form of a parallelepiped having top and bottom surfaces 47 and 48, front and back surfaces 49 and 51, and end surfaces 52 and 53. The elongate saddle has first and second end portions 46a and 46b and a longitudinal axis 54 which extends perpendicular to end surfaces 52 and 53. Mounting block 22 and elongate saddle 46 can be formed of a suitable material such as brass.

Pivot means is provided for mounting elongate saddle 46 in recess 36 of mounting block 22 and consists of a cylindrical pin 56 having a first end portion 56a disposed in a cylindrical bore 58 in mounting block 22 extending through front and back surfaces 26 and 27 in a direction substantially parallel to longitudinal axis 31. Securement means is provided for securing first end portion 56a of cylindrical pin 56 within cylindrical bore 58 to prevent axial and rotational movement of cylindrical pin 56 and consists of a set screw 66 threaded into a cylindrical bore 67 extending substantially perpendicular to cylindrical bore 58 and engaging a flat 68 provided in first end portion 56a of cylindrical pin 56 (see FIG. 6).

Cylindrical pin 56 has a second end portion 56b disposed in a cylindrical bore 61 in elongate saddle 46 equidistant end surfaces 52 and 53 commencing in back surface 51 and extending into the elongate saddle in a direction substantially perpendicular to longitudinal axis 54. Securement means is also provided for securing second end portion 56b within cylindrical bore 61 to prevent axial movement of cylindrical pin 56 and consists of a threaded connection by threading cylindrical bore 61 and second end portion 56b. Alternatively, as shown in FIG. 8, second end portion 56b may be secured within cylindrical bore 61 to prevent axial movement of cylindrical pin 56 by a set screw 69 threaded into a cylindrical bore 71, which commences in bottom surface 48 and extends into cylindrical bore 61 in a direction substantially perpendicular to cylindrical bore 61. Set screw 69 extends into an annular recess 72 provided in second end portion 56b. Still another alternative is shown in FIG. 9 in which a spring loaded pin 73 in cylindrical bore 71 retains second end portion 56b by extending into annular recess 72. Pin 73 is yieldably held in place by a spring 74 retained in cylindrical bore 71 by a threaded insert 76 in cylindrical bore 71.

It should be appreciated that other alternative securement means may be used to secure cylindrical pin 56 within cylindrical bore 58 and cylindrical bore 61 to restrain axial movement while allowing rotational movement of cylindrical pin 56 within either or both of cylindrical bores 58 and 61.

Resilient means capable of compression and expansion is disposed between mounting block 22 and second end portion 46b of elongate saddle 46 for providing a yieldable force and consists of a resilient block 81 of a suitable material such as silicone rubber (see FIG. 7). Alternatively, as shown in FIG. 10, a spring 83 disposed in aligned bores 84 and 86 in mounting block 22 and second end portion 46b, respectively, may be utilized.

Adjustment means is carried by mounting block 22 for adjusting the pivotable position of elongate saddle 46 in recess 36. The adjustment means consists of a set screw 87 threaded into a cylindrical bore 88 (see FIGS. 3 and 7), which extends from top surface 23 into recess 36, and protruding therefrom to engage top surface 47 of elongate saddle 46 at first end portion 46a. Adjustment of set screw 87 causes elongate saddle 46 to pivot about cylindrical pin 56 against the yieldable force, of resilient block 81. A conventional sample holder 91 is removably attached to elongate saddle 46 by a screw 92, with a portion of sample holder 91 extending into recess 41 in mounting block 22. A sample 93 having a front surface 94 is mounted on sample holder 91 in the conventional manner for cross-sectioning.

Operation and use of fixture 21 of the present invention is as follows. Let it be assumed that fixture 21 is used with a conventional polishing machine 100 on which a polishing disk 101 is clockwise rotatably mounted (see FIGS. 1 and 2). A mounting plate 102 is positioned over polishing machine 100 and polishing disk 101 and over a splash ring 103. Mounting plate 102 and splash ring 103 are secured to polishing machine 100 by screws 104. Mounting plate 102 has a front surface 106 with vertical positioning ridges 107 located thereon which are adapted to mate with vertical recesses 42 in the mounting block.

Once sample 93 is aligned and mounted on sample holder 91, the operator mounts sample holder 91 on elongate saddle 46 with screw 92 and adjusts set screw 87 if further initial alignment of sample 93 to mounting block 22 is needed. After any additional preparation of mounting block 22 as shown by the prior art, the operator then places fixture 21 atop rotating polishing disk 101 against front surface 106 of mounting plate 102.

Vertical recesses 42 on back surface 27 of the mounting block may be cooperatively aligned with ridges 107 on front surface 106 of the mounting plate when positioning the fixture against the mounting plate. Mounting plate 102 is constructed such that sample 93 engages polishing disk 101 at a radian 109 of the polishing disk. This ensure cross-sectioning of sample 93 in a direction substantially perpendicular to its front surface 94. Up to eight fixtures can be in operation simultaneously on the mounting plate.

During the polishing process, the operator should periodically remove fixture 21 from polishing disk 101 and sample holder 91 from elongate saddle 46 to microscopically inspect the polished surface of sample 93. In a standard application involving integrated circuits, it may be necessary to adjust the polishing plane to align it with the features on the integrated circuit that require inspection. The present invention, through inclusion of elongate saddle 46 on mounting block 22, permits precise adjustments to the angle of polishing on sample 93 to change the polishing plane. Once sample holder 91 has been remounted to elongate saddle 46, realignment of the polishing plane is accomplished by turning set screw 87 in mounting block 22 to pivot the elongate saddle about cylindrical pin 56. As the position of elongate saddle 46 is so pivotably adjusted, the angle at which sample 93 will engage polishing disk 101 is adjusted. The operator places fixture 21 on polishing disk 101 again to continue the polishing operation, repeating the inspection and adjustment procedure referred to above as necessary to obtain the desired angle of polishing and polishing plane. The presence of silicone block 81 or other resilient means between upper wall 38 and second end portion 46b ensures retention of the desired position of elongate saddle 46 with respect to mounting block 22 during the polishing operation and during removal of sample holder 91 from elongate saddle 46 for inspection of sample 93.

The greater the distance between the point where set screw 87 engages first end portion 46a of elongate saddle 46 and the central axis of cylindrical bore 58 which houses cylindrical pin 56, the finer adjustments with like turning of set screw 87 can be made to the position of elongate saddle 46 with respect to mounting block 22 and, hence, to the angle of polishing of sample 93. A suitable length for elongate saddle 46 is approximately one and a half inches, and a suitable maximum spacing between upper wall 38 of recess 36 and top surface 47 of first end portion 46a is approximately one tenth of an inch. A thread size of 4-40 for set screw 87 has been found to be acceptable.

The present invention allows precise adjustments to the position of elongate saddle 46 with respect to mounting block 22 through about a one degree angle. The invention is particularly valuable for polishing integrated circuits on semiconductor chips where it is sometimes necessary to parallel polish down opposite sides of sample 93 to a thickness of approximately 30 microns to allow inspection of the sample through a transmission electron microscope. In this application, the integrated circuit is polished to a desired plane on one side, remounted to sample holder 91 in a position to permit polishing of the opposite side of the integrated circuit, and then polished in a plane parallel to the polished plane on the first named side to the desired thickness. Several inspections of the integrated circuit and adjustments to the angle of polishing may be necessary during this application.

It has been found in certain applications of the fixture of the present invention that it is desirable to adjust the gravitational force being applied by the fixture to the sample during polishing. This is accomplished by adding a weight 121 disposed on top surface 23 of mounting block 22 (see FIGS. 11 through 13). Weight 121 is in the form of a parallelepiped having top and bottom surfaces 122 and 123, front and back surfaces 124 and 126, and side surfaces 127 and 128. Weight 121 has a longitudinal axis 129 which extends perpendicular to front and back surfaces 124 and 126 and substantially overlies and is in alignment with longitudinal axis 31 of mounting block 22.

Weight 121 is adjustable into at least three different positions on mounting block 22 to thereby adjust the gravitational force applied to sample 93 carried by sample holder 91.

Cooperative mating means is provided to permit this adjustment and consists of aligned male protrusions 131 formed in top surface 122 of weight 121 approximately equidistant from front and back surfaces 124 and 126 and aligned male protrusions 132 formed in bottom surface 123 of weight 121 adjacent front surface 124. Male protrusions 131 and 132 are adapted to mate with aligned female recesses 133 formed in each side of top surface 23 of mounting block 22. The cooperative mating means also includes female recess 136 extending into top surface 23 of mounting block 22 which mates with male portions 121a of weight 121 to prevent lateral movement of weight 121.

One position made possible by this cooperative mating means is shown in FIG. 11 with front surface 124 of weight 121 facing the front of mounting block 22. The second position is shown in FIG. 12 in which back surface 126 of weight 121 faces the front of the mounting block. In each case, male protrusions 132 on bottom surface 123 of weight 121 respectively engage female recesses 133 on top surface 23 of mounting block 22. The third position is shown in FIG. 13. Weight 121 is inverted so that top surface 122 of the weight faces downwardly and male protrusions 131 on top surface 122 of the weight respectively engage female recesses 133 on top surface 23 of mounting block 22. Positioning weight 121 closer to the front of mounting block 22 increases the gravitational force on sample 93 and the cross-sectional rate on the sample.

In view of the foregoing, it can be seen that the fixture of the present invention in which the sample holder carrying the sample can be precisely adjusted to make possible cross-sectioning of less than one micron line widths parallel to features in an integrated circuit on a semiconductor chip improves the existing art. The use of an adjustable weight makes it possible to adjust the polishing rate.

What is claimed is:

1. A fixture for use in non-encapsulated cross-sectioning of a sample comprising a mounting block having a longitudinal axis and having front and bottom surfaces with a recess extending through the front and bottom surfaces, an elongate saddle having a longitudinal axis and first and second end portions, pivotable means for mounting said elongate saddle in the recess on said mounting block to permit pivotable movement of said elongate saddle, resilient means disposed between said mounting block and the second end portion of said elongate saddle for applying a yieldable force between said mounting block and said second end portion, adjustment means carried by said mounting block and engaging the first end portion of said elongate saddle for adjusting the spacing between said mounting block and said first end portion against the resilient means, and a sample holder mounted on said elongate saddle for holding said sample.

2. A fixture as in claim 1 wherein said pivotable means for mounting said elongate saddle to said mounting block includes a cylindrical pin having first and second end portions, wherein said mounting block is provided with a bore extending into said mounting block in a direction substantially parallel to the longitudinal axis of said mounting block for housing of the first end portion of said cylindrical pin, wherein said elongate saddle is provided with a bore extending into said elongate saddle in a direction substantially perpendicular to the longitudinal axis of said elongate saddle for housing of the second end portion of said cylindrical pin, means for securing the first end portion of said cylindrical pin in the bore in said mounting block and means for securing the second end portion of said cylindrical pin in the bore in said elongate saddle to thereby retain said elongate saddle in said recess.

3. A fixture as in claim 2 wherein said mounting block is provided with an additional bore which is threaded and extends into said first named bore in said mounting block in a direction substantially perpendicular to said first named bore, together with a set screw threaded into said additional bore and engaging the first end portion of said cylindrical pin.

4. A fixture as in claim 2 wherein said bore in said elongate saddle is threaded, wherein the second end portion of said cylindrical pin is threaded and threadedly engages the threads in the bore in said elongate saddle.

5. A fixture as in claim 2 wherein the second end portion of said cylindrical pin is formed with an annular recess, wherein said elongate saddle is provided with an additional bore which is threaded and extends into said first named bore in said elongate saddle in a direction substantially perpendicular to said first named bore, together with a set screw threaded into said additional bore and extending into said annular recess.

6. A fixture as in claim 2 wherein the second end portion of said cylindrical pin is formed with an annular recess, wherein said elongate saddle is provided with an additional bore which is threaded and extends into said first named bore in said elongate saddle, together with a spring loaded pin threaded into said additional bore and extending into said annular recess.

7. A fixture as in claim 1 wherein said resilient means is comprised of a resilient block of material.

8. A fixture as in claim 1 wherein said resilient means includes a spring.

9. A fixture as in claim 1 wherein said mounting block has a top surface, together with a weight and means for adjustably positioning said weight on said top surface to adjust the gravitational force on said sample.

10. A fixture as in claim 9 wherein said means for adjustably positioning said weight on said mounting block includes cooperative mating means carried by said weight and said mounting block for retaining said weight in predetermined positions on said mounting block.

11. A fixture as in claim 10 wherein said weight has top, bottom and front surfaces and has a longitudinal axis generally overlying and in alignment with the longitudinal axis of said mounting block, wherein said cooperative mating means includes male protrusions and female recesses on the top surface of said mounting block and on the top and bottom surfaces of said weight, said male protrusions and female recesses being carried by the top and bottom surfaces of said weight being offset with respect to each other in a direction longitudinal to the longitudinal axis of said weight, whereby when said weight is turned over so that its top surface faces downwardly and said male protrusions and female recesses carried by said top surface engage said cooperative male protrusions and female recesses of said mounting block the position of said weight is shifted in a direction longitudinal of the longitudinal axis of said mounting block.

12. In a fixture for mounting a semiconductor chip for use in polishing the semiconductor chip against a rotating polishing disk, a mounting block having a front surface and bottom surface with a recess extending through the front and bottom surfaces, an elongate saddle having first and second end portions, pivot means for mounting said elongate saddle in the recess on said mounting block to permit pivotable movement of said elongate saddle in said recess, resilient means disposed between the second end portion of said elongate saddle and said mounting block for applying a yieldable force between said mounting block and said second end portion and adjustment means mounted in said mounting block and engaging the first end portion of said elongate saddle to adjust the position of said elongate saddle against the force of said resilient means, and a sample holder mounted on said elongate saddle for attaching said semiconductor chip for a polishing operation on said chip.

13. In a fixture for polishing a semiconductor chip utilizing a rotating polishing disk in which said fixture overlies said polishing disk, a mounting block having a top surface, and front and back surfaces with a longitudinal axis extending perpendicular to the front and back surfaces a sample holder carried by said mounting block forward of the back surface, for supporting said semiconductor chip, a weight disposed on the top surface of said mounting block to apply a gravitational force on said semiconductor chip as it engages said rotating polishing disk and cooperative mating means carried by said weight and the top surface of said mounting block for adjusting the location of said weight substantially parallel to the longitudinal axis of said mounting block to thereby adjust the gravitational force on said semiconductor chip.

14. A fixture as in claim 13 wherein said mounting block has a longitudinal axis, wherein said weight has top and bottom surfaces and a longitudinal axis substantially overlying and in alignment with the longitudinal axis of said mounting block, wherein said cooperative mating means includes male protrusions and female recesses on the top surface of said mounting block and on the top and bottom surfaces of said weight, said male protrusions and female recesses being carried by the top and bottom surfaces of said weight being offset with respect to each other in a direction longitudinal of the longitudinal axis of said weight, whereby when said weight is turned over so that its top surface faces downwardly and said male protrusions and female recesses carried by said top surface engage said cooperative male protrusions and female recesses of said mounting block the position of said weight is shifted in a direction longitudinal of the longitudinal axis of said mounting block.

15. A fixture as in claim 13 wherein said mounting block has a longitudinal axis, wherein said weight has a bottom surface and a longitudinal axis substantially overlying and in alignment with the longitudinal axis of said mounting block, wherein said cooperative mating means includes male protrusions and female recesses on the top surface of said mounting block and on the bottom surface of said weight, whereby said male protrusions and female recesses carried by said weight can be positioned with respect to said cooperative male protrusions and female recesses carried by the top surface of said mounting block to shift the position of said weight in a direction longitudinal of the longitudinal axis of said mounting block.

16. A fixture as in claim 14 whereby said male protrusions and female recesses carried by each of the top and bottom surfaces of said weight can be further positioned with respect to said cooperative male protrusions and female recesses carried by the top surface of said mounting block to shift the position of said weight in a direction longitudinal of the longitudinal axis of said mounting block.

17. A fixture as in claim 13 wherein said mounting block is provided with a longitudinal axis, wherein said weight has top, bottom and front surfaces and a longitudinal axis substantially overlying and in alignment with the longitudinal axis of said mounting block, wherein said cooperative mating means includes male protrusions and female recesses on the top surface of said mounting block and on the top and bottom surfaces of said weight, said male protrusions and female recesses being carried by the top and bottom surfaces of said weight being offset with respect to each other in a direction longitudinal to the longitudinal axis of said weight, whereby when said weight is turned over so that its front surface faces rearwardly and its top surface faces downwardly and said male protrusions and female recesses carried by said top surface engage said cooperative male protrusions and female recesses of said mounting block the position of said weight is shifted in a direction longitudinal of the longitudinal axis of said mounting block, and whereby further when said weight is rotated again so that its top surface faces upwardly but its front surface remains facing rearwardly and the male protrusions and female recesses carried by its bottom surface engage the cooperative male protrusions and female recesses of the mounting block then the position of the weight is further shifted in a direction longitudinal of the longitudinal axis of the mounting block.

18. In a fixture for polishing a semiconductor chip utilizing a rotating polishing disk in which said fixture overlies said polishing disk, a mounting block having a longitudinal axis and having front and bottom surfaces with a recess extending through the front and bottom surfaces, an elongate saddle having a longitudinal axis and first and second end portions, pivotable means for mounting said elongate saddle in the recess on said mounting block to permit pivotable movement of said elongate saddle about the longitudinal axis of said mounting block, a sample holder mounted on said elongate saddle for holding said semiconductor chip and positioning means carried by said mounting block and engaging said elongate saddle for adjusting the angular position of said elongate saddle with respect to said mounting block and hence the angular position of said semiconductor chip with respect to said polishing disk.

* * * * *